United States Patent
Lee et al.

(10) Patent No.: US 10,366,022 B2
(45) Date of Patent: Jul. 30, 2019

(54) DATA TRAINING METHOD OF STORAGE DEVICE

(71) Applicant: SAMSUNG ELECTRONICS CO., LTD., Suwon-si, Gyeonggi-Do (KR)

(72) Inventors: Chulseung Lee, Seoul (KR); Taesung Lee, Hwaseong-si (KR); Choongeui Lee, Suwon-si (KR); Soon Suk Hwang, Ansan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 19 days.

(21) Appl. No.: 15/871,637

(22) Filed: Jan. 15, 2018

(65) Prior Publication Data

US 2019/0004984 A1  Jan. 3, 2019

(30) Foreign Application Priority Data

Jul. 3, 2017 (KR) .......................... 10-2017-0084195

(51) Int. Cl.
*G06F 13/16* (2006.01)
*G06K 9/62* (2006.01)
*G06F 13/12* (2006.01)
*G06N 20/00* (2019.01)

(52) U.S. Cl.
CPC ........ *G06F 13/1689* (2013.01); *G06F 13/126* (2013.01); *G06F 13/1657* (2013.01); *G06K 9/6255* (2013.01); *G06N 20/00* (2019.01)

(58) Field of Classification Search
CPC ...... G06F 11/26; G06F 11/263; G06F 11/277; G06F 11/28; G06F 13/1689; G06K 9/6255
See application file for complete search history.

(56) References Cited

U.S. PATENT DOCUMENTS

| | | | | |
|---|---|---|---|---|
| 5,889,728 A | * | 3/1999 | Rezeanu | G11C 11/413 365/189.19 |
| 6,898,726 B1 | * | 5/2005 | Lee | G06F 1/04 327/156 |
| 6,941,433 B1 | * | 9/2005 | Libby | G06F 13/4239 365/191 |
| 7,272,739 B1 | * | 9/2007 | Boduch | H04J 3/0688 370/230 |
| 7,415,569 B2 | * | 8/2008 | Dietrich | G11C 7/1078 711/105 |

(Continued)

FOREIGN PATENT DOCUMENTS

KR  10-2010-0050881 A  5/2010

*Primary Examiner* — Midys Rojas
*Assistant Examiner* — Khoa D Doan
(74) *Attorney, Agent, or Firm* — Volentine, Whitt & Francos, PLLC

(57) ABSTRACT

A data training method of a storage device, which includes a storage controller and a nonvolatile memory device, includes transmitting a read training command to the nonvolatile memory device, receiving a first training pattern output from the nonvolatile memory device in response to the read training command, receiving a second training pattern output from the nonvolatile memory device in response to the read training command, comparing the received first training pattern and the received second training pattern with a reference pattern, and determining a read timing offset of the storage controller depending on the comparison result.

20 Claims, 13 Drawing Sheets

(56) References Cited

U.S. PATENT DOCUMENTS

| | | | |
|---|---|---|---|
| 7,558,979 B2* | 7/2009 | Song | G11C 29/023 370/508 |
| 7,612,582 B2* | 11/2009 | Ward | G05B 19/056 326/38 |
| 8,050,136 B2* | 11/2011 | Park | G06F 13/1689 365/233.1 |
| 8,120,965 B2 | 2/2012 | Yang | |
| 8,437,216 B2* | 5/2013 | Oh | G11C 7/1087 365/185.28 |
| 8,488,729 B1* | 7/2013 | Mendel | H04L 25/14 375/354 |
| 8,504,788 B2* | 8/2013 | Stott | G11C 7/02 711/167 |
| 8,578,086 B2* | 11/2013 | Chaudhuri | G11C 7/10 711/100 |
| 8,819,474 B2 | 8/2014 | Schoenborn et al. | |
| 8,880,831 B2 | 11/2014 | Krishnan et al. | |
| 9,166,838 B1* | 10/2015 | Luo | H03K 3/013 |
| 9,251,906 B1* | 2/2016 | Jain | G11C 7/22 |
| 9,355,051 B2* | 5/2016 | Zitlaw | G06F 13/28 |
| 9,443,602 B2* | 9/2016 | Sakaue | G11C 16/32 |
| 9,811,273 B1* | 11/2017 | Brahmadathan | G06F 3/0619 |
| 9,881,662 B2* | 1/2018 | Giovannini | G11C 7/1078 |
| 10,203,875 B1* | 2/2019 | Ying | G06F 3/0604 |
| 2001/0014922 A1* | 8/2001 | Kuge | G06F 13/1689 710/36 |
| 2009/0059693 A1* | 3/2009 | Bae | G11C 5/063 365/193 |
| 2010/0082967 A1 | 4/2010 | Lo | |
| 2012/0290800 A1* | 11/2012 | Krishnan | G06F 13/1689 711/159 |
| 2013/0132652 A1* | 5/2013 | Wood | G06F 12/0246 711/103 |
| 2013/0346721 A1* | 12/2013 | Giovannini | G11C 7/222 711/167 |
| 2014/0047158 A1* | 2/2014 | Frans | G06F 12/0246 711/102 |
| 2015/0134890 A1* | 5/2015 | Beattie | G11C 29/022 711/103 |
| 2015/0162061 A1* | 6/2015 | Gopalakrishnan | G11C 29/023 365/194 |
| 2017/0168984 A1* | 6/2017 | Bartley | G06F 13/4291 |

* cited by examiner

DATA TRAINING METHOD OF STORAGE DEVICE

CROSS-REFERENCE TO RELATED APPLICATIONS

A claim for priority under 35 U.S.C. § 119 is made to Korean Patent Application No. 10-2017-0084195 filed Jul. 3, 2017 in the Korean Intellectual Property Office, the entire contents of which are hereby incorporated by reference.

BACKGROUND

Embodiments of the disclosure disclosed herein relate to a semiconductor device, and more particularly, to a data training method of a storage device for performing data training at high speed.

There is a need for data training (or DQ training) to secure the reliability of data in a storage device implemented with a plurality of nonvolatile memory devices and a storage controller. The data training includes read training and write training. The read training refers to an operation in which the storage controller aligns the center of an eye pattern of data Dout output from a nonvolatile memory device. The write training refers to an operation for aligning an eye pattern of data Din to be written in a nonvolatile memory device.

For the data training, the storage controller may write data of a specific pattern in the nonvolatile memory devices respectively or may read data of a specific pattern from a nonvolatile memory device. A command and an address are necessary to write or read data of a specific pattern. Accordingly, a time taken to input a command and an address and to input or output pattern data and a time for AC timing are inevitably required during a training operation.

To implement a high-capacity storage device, the large number of nonvolatile memory devices may be mounted on the storage device. In the storage device including the large number of nonvolatile memory devices, there is a need to reduce open timing for the purpose of providing speedy access performance in a situation such as power-up.

SUMMARY

Embodiments of the disclosure provide a data training method of a storage device in which high-speed data training is possible.

According to an aspect of an embodiment, a data training method of a storage device, which comprises a storage controller and a nonvolatile memory device, includes transmitting a read training command to the nonvolatile memory device, receiving a first training pattern output from the nonvolatile memory device in response to the read training command, under a first read timing offset condition, receiving a second training pattern output from the nonvolatile memory device in response to the read training command, under a second read timing offset condition, comparing the received first training pattern and the received second training pattern with a reference pattern, and determining a read timing offset of the storage controller depending on the comparison result.

According to another aspect of an embodiment, a data training method of a storage device, which comprises a storage controller and a nonvolatile memory device, includes inputting a write training command to the nonvolatile memory device, inputting a training pattern to the nonvolatile memory device under a first write timing offset condition following the write training command, reading the training pattern written under the first write timing offset condition from the nonvolatile memory device as first output data, inputting the training pattern to the nonvolatile memory device under a second write timing offset condition, reading the training pattern written under the second write timing offset condition from the nonvolatile memory device as second output data, comparing the first output data and the second output data with a reference pattern, and determining a write timing offset of the storage controller depending on the comparison result.

According to another aspect of an embodiment, a data training method of a storage device, which comprises a storage controller and a nonvolatile memory device, includes inputting a write command to the nonvolatile memory device, writing a training pattern in the nonvolatile memory device repeatedly under different write timing offset conditions following the write command, inputting a read command to the nonvolatile memory device, receiving a plurality of training patterns output from the nonvolatile memory device in response to the read command, and determining a write timing offset of the storage controller by using the received training patterns.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
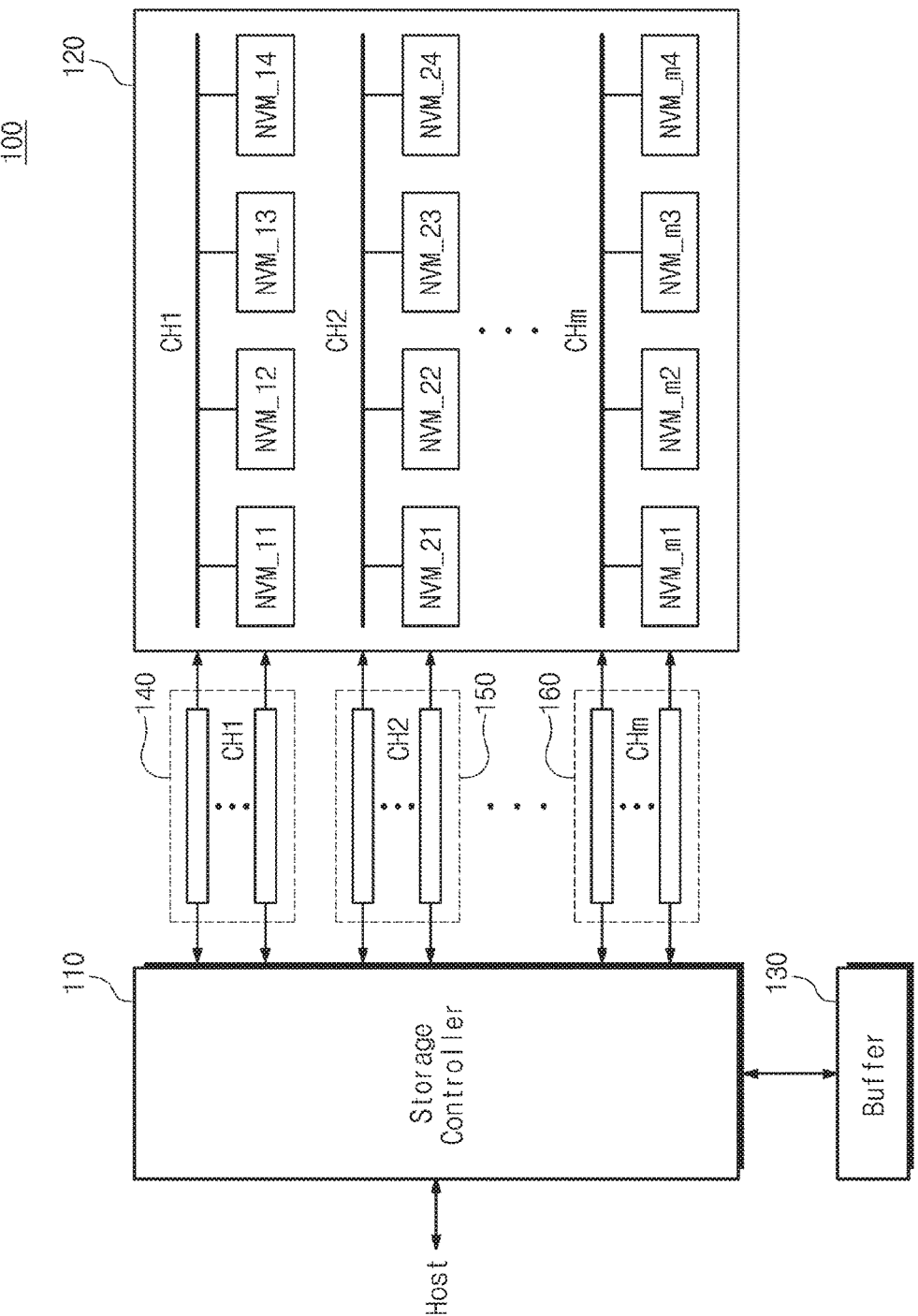
FIG. 1 is a block diagram illustrating a storage device according to an embodiment of the disclosure.

It is to be understood that both the foregoing general description and the following detailed description are provided as examples, for illustration and not for limiting the scope of the disclosure. Reference numerals will be represented in detail in embodiments of the disclosure, examples of which are illustrated in the accompanying drawings. Wherever possible, the same reference numerals are used in the drawings and the description to refer to the same or similar parts.

Below, a NAND-type flash memory device will be exemplified as a nonvolatile memory device for describing features and functions of the disclosure. However, one skilled in the art may easily understand other merits and performance of the disclosure depending on the contents disclosed here. For example, the features of the disclosure may be applied to a phase-change RAM (PRAM), a magnetoresistive RAM (MRAM), a resistive RAM (ReRAM), a ferroelectric RAM (FRAM), a NOR flash memory, etc. as the nonvolatile memory device. Here, the term "data training" used in this specification means an operation of searching for and adjusting a center of an eye pattern of a data line.

The disclosure may be implemented or applied through other embodiments. In addition, the detailed description may be changed or modified according to view points and applications without departing from the claims, the scope and spirit, and any other purposes of the disclosure. Below, embodiments of the disclosure will be described in detail with reference to the accompanying drawings.

FIG. 1 is a block diagram illustrating a storage device according to an embodiment of the disclosure. Referring to FIG. 1, a storage device 100 includes a storage controller 110, a storage medium 120, and a buffer 130. One or more channels 140, 150, and 160 for data and signal exchange are provided between the storage controller 110 and the storage medium 120.

The storage controller 110 may be configured to control the storage medium 120. For example, in response to an external request, the storage controller 110 may write data in the storage medium 120 or may read data stored in the storage medium 120. To access the storage medium 120, the storage controller 110 may provide the storage medium 120 with a command, an address, and a control signal.

The storage controller 110 may access the storage medium 120 for the purpose of reading data that the host 100 requests. The storage controller 110 may be connected to the storage medium 120 through the one or more channels 140, 150, and 160. To improve the efficiency of access, the storage controller 110 may access the storage medium 120 by using the one or more channels 140, 150, and 160 depending on a channel interleaving manner.

The storage controller 110 may perform data training (also referred to as "DQ training") of the storage medium 120 in a booting or specific situation of the storage device 100. The storage controller 110 may improve the reliability of data exchange with the storage medium 120 through the data training. For example, the storage controller 110 may write or read a training pattern in the storage medium 120 under various conditions to detect the center of a data signal DQ. To align the detected center of the data signal DQ, the storage controller 110 may adjust an offset value of a delay locked loop (DLL) or a phase locked loop (PLL).

In particular, the storage controller 110 of the disclosure may perform the data training (or DQ training) under the condition that the storage controller 110 transmits the minimum number of commands and addresses to a selected nonvolatile memory device. That is, for read training or write training, the storage controller 110 may transmit or receive the data signal DQ corresponding to various offsets even though the storage controller 110 issues a command sequence to the selected nonvolatile memory device once or twice. Accordingly, it may be possible to markedly reduce a time for a command and AC timing in the storage device 100 that performs the data training of the large number of nonvolatile memory devices.

The storage medium 120 includes a plurality of nonvolatile memory devices NVM_mn. The nonvolatile memory devices NVM_mn may be connected to the storage controller 110 through a plurality of channels. For example, the nonvolatile memory devices NVM_11 to NVM_14 are connected to the storage controller 110 through a first channel CH1. That is, the nonvolatile memory devices NVM_11 to NVM_14 share a data signal (DQ) line for exchanging data with the storage controller 110. Likewise, the nonvolatile memory devices NVM_21 to NVM_24 are connected to the storage controller 110 through a second channel CH2. And, the nonvolatile memory devices NVM_m1 to NVM_m4 are connected to the storage controller 110 through a third channel CHm. Here, the number of nonvolatile memory devices included in one channel may be a way interleaving unit.

The buffer 130 is a memory that temporarily stores data transmitted between a host, Host, and the storage medium 120. For example, the buffer 130 may be implemented with a dynamic random access memory (DRAM).

The one or more channels 140, 150, and 160 are communication channels classified in units of a data signal (DQ) line. Each of the channels 140, 150, and 160 corresponds to a data path through which the storage controller 110 and the storage medium 120 transmit data independently. For example, when a data signal DQ_1 and a strobe signal DQS_1 are transmitted through the first channel 140, another data signal DQ_2 and another strobe signal DQS_2 are transmitted through the second channel 150. Each of the channels 140, 150, and 160 shares a data signal (DQ) line. However, chip enable signals /CE for respectively selecting nonvolatile memory devices included in a channel may be provided in units of a chip. The storage controller 110 may perform interleaving of channel and way units by using the above-described channel structure.

There is simply described the storage device 100 capable of reducing a time necessary for a transfer of a command sequence and AC timing during the data training (DQ training) operation. For the command and AC timing associated with the data training of the disclosure, there is a need to newly define command interfaces of the storage controller 110 and the nonvolatile memory devices NVM_mn included in the storage medium 120. That is, each of the nonvolatile memory devices NVM_mn should perform a plurality of data output operations or a plurality of data input operations in response to a single command provided in a read training operation or a write training operation. In the case of applying the data training manner of the disclosure, it may be possible to markedly reduce a time necessary for the data training upon booting the storage device 100 including the large number of nonvolatile memory devices.

Figure 2:
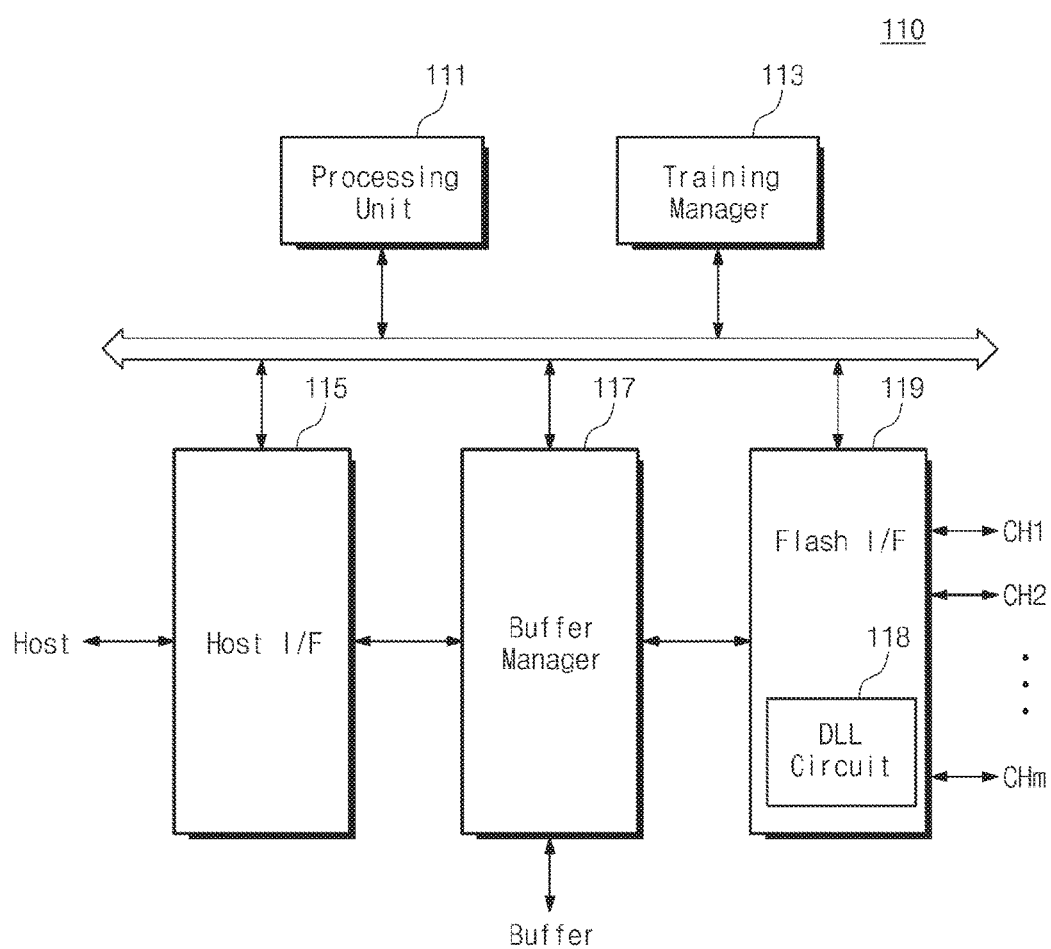
FIG. 2 is a block diagram illustrating a storage controller of the disclosure.

FIG. 2 is a block diagram illustrating a storage controller of the disclosure. Referring to FIG. 2, the storage controller 110 includes a processing unit 111, a training manager 113, a host interface 115, a buffer manager 117, and a flash interface 119. However, it may be well understood that elements of the storage controller 110 are not limited to the aforementioned elements. For example, the storage controller 110 may further include a read only memory (ROM) that stores code data necessary for an initial booting operation, or a working memory.

The processing unit 111 may include a central processing unit or a micro-processor. The processing unit 111 may manage overall operations of the storage controller 110. The processing unit 111 may execute firmware for operating the storage controller 110.

The training manager 113 may perform data training (DQ training) for communication with the storage medium 120 in a specific situation such as booting of the storage device 100. The training manager 113 may compare a training pattern, which is repeatedly transmitted from any one nonvolatile memory device NVM selected for the data training, with reference data to determine an optimal timing offset. A timing offset of a delay locked loop (DLL) or a phase locked loop (PLL) included in the flash interface 119 may be adjusted by using the determined optimal timing offset. It may be well understood that the training manager 113 is implemented with hardware or is provided in the form of firmware loaded on the working memory.

The host interface 115 may provide an interface between the host and the storage controller 110. The host and the storage controller 110 may be connected through at least one of various standardized interfaces. As another example, the host and the storage controller 110 may be connected through at least one of various standardized interfaces. Here, the standardized interfaces may include various interface manners such as advanced technology attachment (ATA), serial ATA (SATA), external SATA (e-SATA), mini SATA (mSATA), small computer small interface (SCSI), serial attached SCSI (SAS), peripheral component interconnection (PCI), PCI Express (PCI-E), universal serial bus (USB), IEEE 1394, universal flash storage (UFS), and card interface.

The buffer manager 117 controls the buffer 130 such that data exchanged through the host interface 115 and the flash interface 119 are temporarily stored. Also, the buffer manager 117 may store a training pattern transmitted from a nonvolatile memory device selected from the storage medium 120 in a read training operation or a write training operation.

The flash interface 119 may provide an interface between the storage controller 110 and nonvolatile memory devices included in the storage medium 120. For example, data processed by the processing unit 111 are transmitted to the storage medium 120 through the flash interface 119. As another example, data stored in a nonvolatile memory device of the storage medium 120 are read out through the flash interface 119. The flash interface 119 may be connected with nonvolatile memory devices in units of a channel.

The flash interface 119 may include a clock circuit for exchanging the data signal DQ with the storage medium 120. For example, the flash interface 119 may include a delay locked loop (DLL) circuit 118. The center of the data signal DQ transmitted from the storage medium 120 may be aligned by adjusting a timing offset of the delay locked loop circuit 118. In the data training operation, the flash interface 119 may receive or transmit a training pattern repeatedly by providing a command for one-time training to the selected nonvolatile memory device. This will be described in detail with reference to the following timing diagram.

The elements of the storage controller 110 are exemplified above. The storage controller 110 of the disclosure may exchange a training pattern with the selected nonvolatile memory device over a plurality of sequences by issuing the training command once. Accordingly, it may be possible to markedly reduce a time needed to perform the data training operation.

Figure 3:
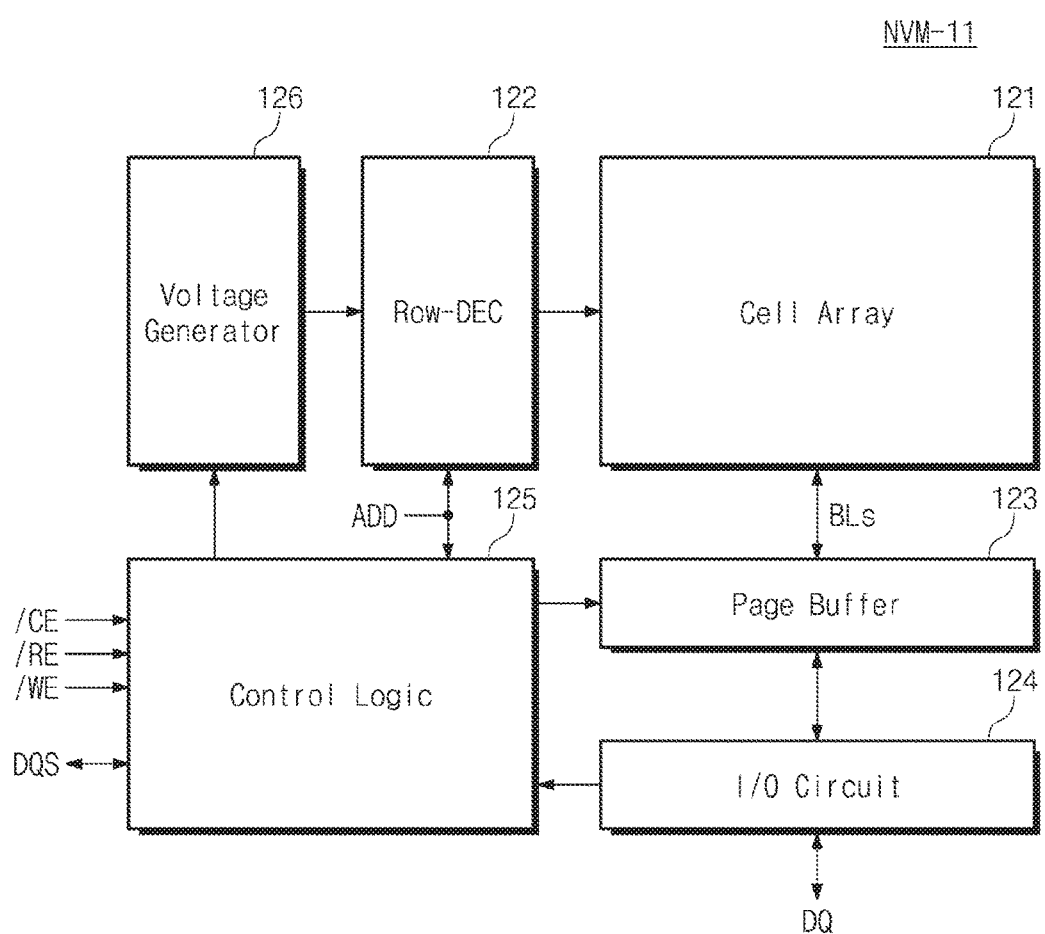
FIG. 3 is a block diagram illustrating one of nonvolatile memory devices included in a storage medium of FIG. 1.

FIG. 3 is a block diagram illustrating one of nonvolatile memory devices included in a storage medium of FIG. 1. Referring to FIG. 3, a nonvolatile memory device NVM_11 may include a cell array 121, a row decoder 122, a page buffer 123, an input/output circuit 124, control logic 125, and a voltage generator 126.

The cell array 121 is connected to the row decoder 122 through word lines WL and/or selection lines SSL and GSL. The cell array 121 is connected to the page buffer 123 through bit lines BLs. The cell array 121 may include a plurality of cell strings formed in a NAND type. The cell strings may constitute a memory block BLK. Here, a channel of each cell string may be formed in a vertical or horizontal direction. The memory cells included in the cell array 121 are programmed by voltages that are provided to a word line and bit lines.

In an embodiment, the cell array 121 may be implemented with a three dimensional (3D) memory array. The three-dimensional memory array may be monolithically formed in one or more physical level(s) of a memory cell array having an active area arranged on a silicon substrate or a circuit related to an operation of memory cells. The circuit related to an operation of memory cells may be located in a substrate or on a substrate. The term "monolithic" means that layers of each level of the array are directly deposited on the layers of each underlying level of the array.

The row decoder 122 may select one of memory blocks of the cell array 121 in response to an address ADD. The row decoder 122 may select one of word lines of the selected memory block. The row decoder 122 supplies a word line voltage VWL provided from the voltage generator 126 to the selected word line.

The page buffer 123 may operate as a write driver in a program operation and as a sense amplifier in a read operation. In the program operation, the page buffer 123 supplies a bit line voltage corresponding to to-be-programmed data to a bit line of the cell array 121. In the read operation, the page buffer 123 may sense data stored in a selected memory cell through a bit line. The page buffer 123 latches the sensed data and outputs the latched data to the input/output circuit 124. The page buffer 123 of the disclosure may be used as a first-in first-out (FIFO) buffer that stores a training pattern in a data training operation. That is, in a write training operation, the training pattern may be output after being stored in the page buffer 123, without storing the training pattern in the cell array 121.

The input/output circuit 124 transmits write data received in the program operation to the page buffer 123. The input/output circuit 124 outputs data provided from the page buffer 123 to the outside in the read operation. The input/output circuit 124 transmits the received address ADD or the received command to the row decoder 122 or the control logic 125.

The control logic 125 controls the page buffer 123 and the voltage generator 126 in response to a command and control signals /CE, /RE, /WE, and DQS transmitted from the outside. In particular, the control logic 125 may control the page buffer 123 and the input/output circuit 124 in response to a command provided once for the data training operation such that data are received or output continuously. For example, in the read training operation, the control logic 125 may output the same pattern data repeatedly in response to a read training command CMD_RT and a pattern address PT_ADD received through the input/output circuit 124. That is, the control logic 125 may output pattern data periodically or in response to a flag signal of the storage controller 110 such that the storage controller 110 changes an offset repeatedly to receive the pattern data. The command sequence for the above-described data training operation may be identically applied to the write training operation as well as the read training operation.

The voltage generator 126 may generate various word line voltages VWL to be supplied to word lines and a voltage to be supplied to a bulk (e.g., a well area) in which memory cells are formed, under control of the control logic 125. The word line voltages to be supplied to the word lines include a program voltage (e.g., Vpgm), a pass voltage (e.g., Vpass), selection and non-selection read voltages (e.g., Vrd and Vread), etc.

The nonvolatile memory device NVM_11 of the disclosure may be provided with a specific command sequence for a data training operation. For example, the nonvolatile memory device NVM_11 may output a training pattern repeatedly in response to the read training command CMD_RT and the pattern address PT_ADD input once. The use of the command sequence may be identically applied to the write training operation. The nonvolatile memory device NVM_11 of the disclosure may output a training pattern requested from the outside repeatedly at a specific interval even though a command and an address are once input to the nonvolatile memory device NVM_11. Also, in the write training operation, the nonvolatile memory device NVM_11 may store a training pattern provided repeatedly from the outside in the page buffer 123 in response to a training command provided once.

Accordingly, the nonvolatile memory device NVM_11 of the disclosure may markedly reduce the number of times that a command and an address for the data training operation are received. In addition, according to the data training manner of the disclosure, a length of AC timing that is inevitably accompanied to receive a command and an address may be markedly reduced. As a result, it may be possible to markedly reduce a time needed to perform the data training operation.

Figure 4:
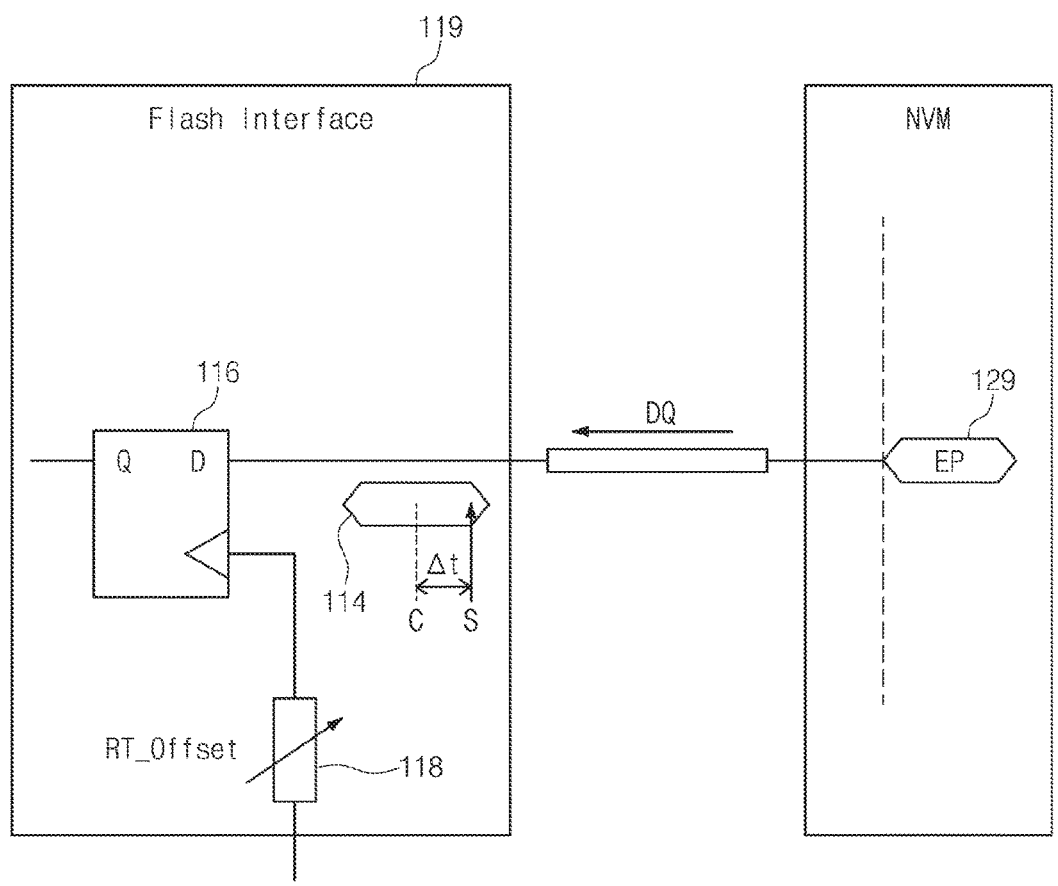
FIG. 4 is a block diagram illustrating read training as an example of data training.

FIG. 4 is a block diagram illustrating read training as an example of data training Referring to FIG. 4, in read training, the flash interface 119 (refer to FIG. 2) may adjust an optimal sampling time point of the data signal DQ provided from a nonvolatile memory device NVM.

If the nonvolatile memory device NVM transmits the data signal DQ to the flash interface 119, a receiver latch 116 of the flash interface 119 samples the transmitted data signal DQ. The nonvolatile memory device NVM may output, for example, the data signal DQ of a center-aligned eye pattern (EP) 129. However, the data signal DQ transmitted to the flash interface 119 may have different delays due to various factors for each channel or for each data line. Read training is an operation for adjusting a sampling time point "S" of an eye pattern 114 of the data signal DQ provided from the nonvolatile memory device NVM to the center "C". That is, a sampling time point of the receiver latch 116 may be adjusted by a time Δt through the read training.

For example, a read timing offset RT_Offset of the DLL circuit 118 providing a clock signal to the receiver latch 116 may be adjusted through the read training. A sampling time point "S" of the data signal DQ provided from the nonvolatile memory device NVM may be aligned to the center "C" of the eye pattern 114 through the above-described read training.

A write training operation is an operation for adjusting a write timing offset of data to be transmitted from the flash interface 119. The write training operation is similar to the read training operation except that the data signal DQ input from the nonvolatile memory device NVM is aligned. Accordingly, a detailed description of the write training operation will not be repeated here.

Figure 5:
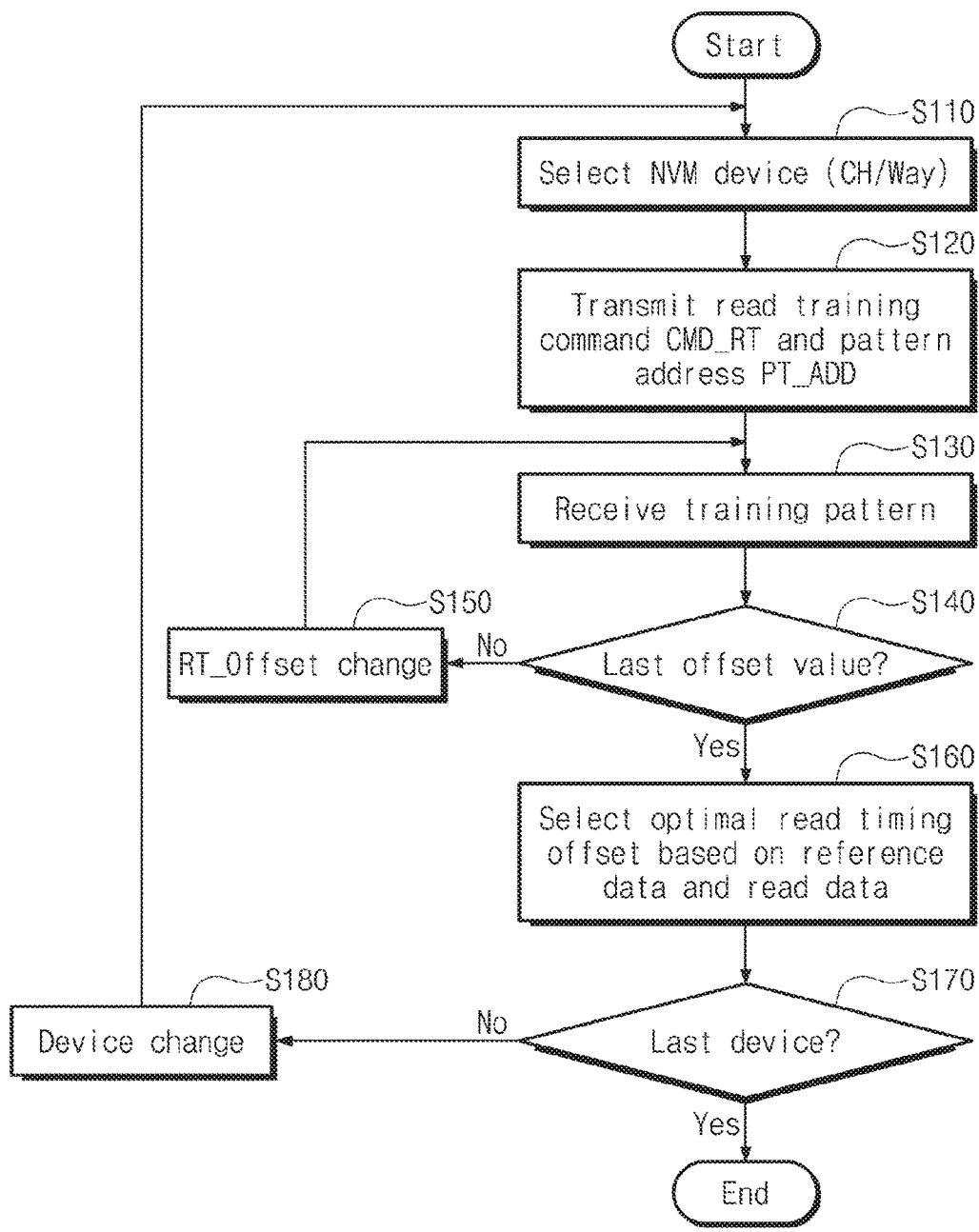
FIG. 5 is a flowchart illustrating a read training method of the storage device according to an embodiment of the disclosure.

FIG. 5 is a flowchart illustrating a read training method of a storage device according to an embodiment of the disclosure. Referring to FIGS. 1 and 5, the storage device 100 of the disclosure may receive a training pattern repeatedly by issuing a command sequence including one training command to a selected nonvolatile memory device.

In operation S110, the storage controller 110 selects any one of a plurality of nonvolatile memory devices included in the storage medium 120. To perform a read training operation, the storage controller 110 may select a channel CH and a way "Way". The storage controller 110 may perform the read training operation on all nonvolatile memory devices in the storage medium in the selection manner.

In operation S120, the storage controller 110 transmits the read training command CMD_RT and the pattern address PT_ADD to the selected nonvolatile memory device. In this case, only a chip enable signal/CE of the selected nonvolatile memory device among the nonvolatile memory devices may be activated. In this case, a timing offset for receiving a data signal of the storage controller 110 may be initialized.

In operation S130, the selected nonvolatile memory device NVM outputs a training pattern corresponding to the pattern address PT_ADD to the storage controller 110. The storage controller 110 may latch and store the training pattern output from the nonvolatile memory device NVM by using the initialized timing offset.

In operation S140, the storage controller 110 may determine whether the timing offset value for receiving the data signal DQ output from the nonvolatile memory device NVM is the last value among a plurality of offset values adjustable. If it is determined in operation S140 that the timing offset value used to receive the training pattern output from the nonvolatile memory device NVM is the last offset value, the process proceeds to operation S160. If it is determined in operation S140 that the timing offset value used to receive the training pattern output from the nonvolatile memory device NVM is not the last offset value, the process proceeds to operation S150.

In operation S150, the storage controller 110 changes the read timing offset RT_Offset. For example, the storage controller 110 may adjust the read timing offset RT_Offset of the DLL circuit 118 or the clock circuit, which is generated to latch data of the flash interface 119. Afterwards, the process may proceed to operation S130 for receiving the training pattern output from the nonvolatile memory device NVM by using the adjusted read timing offset RT_Offset.

In operation S160, the training manager 113 of the storage controller 110 may compare training patterns received by using different read timing offset RT_Offset with a reference pattern. The training manager 113 may detect the same data as the reference pattern from the training patterns received by using different read timing offsets RT_Offset. The training manager 113 selects a read timing offset RT_Offset corresponding to a training pattern having the same logical value as the reference pattern. The training manager 113 may select the selected read timing offset RT_Offset as an optimal read timing offset RT_Offset for a read operation of the nonvolatile memory device selected in operation S110.

In operation S170, the training manager 113 determines whether the nonvolatile memory device selected in operation S110 is the last device of the storage medium 120 for the read training operation. If the selected nonvolatile memory device is the last device of a read training target, the read training method may end. In contrast, if the selected nonvolatile memory device is not the last device of a read training target, the process proceeds to operation S180.

In operation S180, the training manager 113 may select another nonvolatile memory device for the read training operation. Afterwards, the process proceeds to operation S110.

According to the read training method of the storage device 100 of the disclosure, it may be possible to obtain a plurality of training patterns even though the read training command CMD_RT is once issued to the selected nonvolatile memory device. The storage controller 110 receives each training pattern by using different read timing offsets RT_Offset. An optimal read timing offset RT_Offset may be determined by comparing the received training pattern with the reference pattern.

Figure 6:
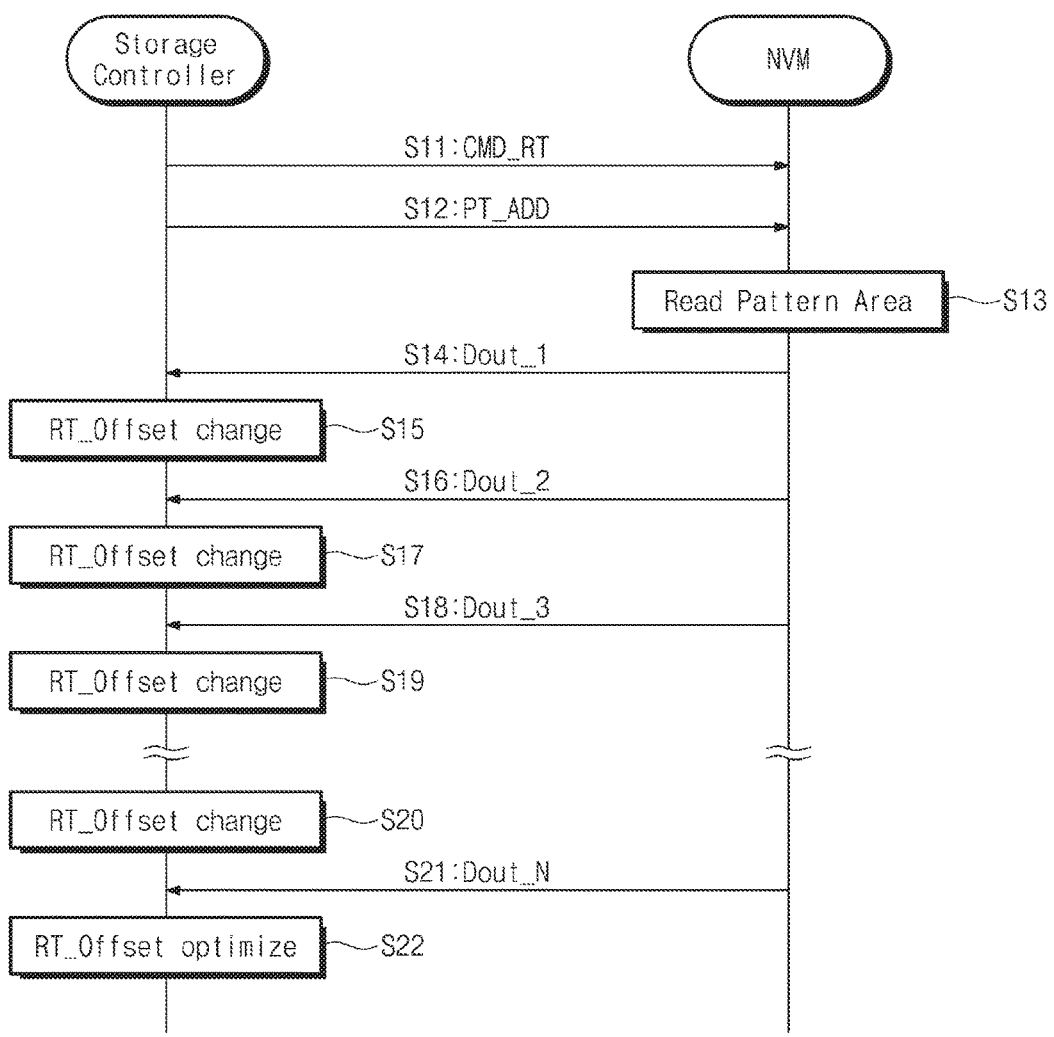
FIG. 6 is a view illustrating a read training method according to an embodiment of the disclosure.

FIG. 6 is a view illustrating a read training method according to an embodiment of the disclosure. Referring to FIG. 6, the storage controller 110 may transmit a training command sequence according to an embodiment of the disclosure to the nonvolatile memory device NVM to perform read training. That is, the storage controller 110 may transmit the read training command CMD_RT and the pattern address PT_ADD once to the nonvolatile memory device NVM and may receive a plurality of training patterns.

In operation S11 and operation S12, the storage controller 110 transmits the read training command CMD_RT and the pattern address PT_ADD to the nonvolatile memory device NVM. Here, the read training command CMD_RT may be implemented with a specific command code provided through a data input/output pad of the nonvolatile memory device NVM. In a period where the specific command code is provided, a write enable signal /WE may be toggled together with activation of a command latch enable signal CLE. In this case, the read training command CMD_RT is input to the nonvolatile memory device NVM. A pattern address may be provided to the nonvolatile memory device NVM following the read training command CMD_RT.

In operation S13, the control logic 125 (refer to FIG. 3) of the nonvolatile memory device NVM identifies the read training command CMD_RT and reads a training pattern from a memory region specified by the pattern address PT_ADD. The training pattern may be, for example, data stored in a specific memory region of the nonvolatile memory device NVM.

In operation S14, the nonvolatile memory device NVM output a first training pattern Dout_1 in synchronization with toggling of the read enable signal /RE provided from the storage controller 110. In this case, the storage controller 110 latches and stores the first training pattern Dout_1 output from the nonvolatile memory device NVM based on the initialized read timing offset.

In operation S15, the storage controller 110 adjusts the read timing offset. In this case, the storage controller 110 may release selection of the nonvolatile memory device NVM. That is, the storage controller 110 may deactivate the chip enable signal /CE provided to the selected nonvolatile memory device at a high level. However, the deactivation of the chip enable signal /CE of the nonvolatile memory device NVM may be omitted at a point in time to adjust the read timing offset if necessary.

In operation S16, the nonvolatile memory device NVM output a second training pattern Dout_2 in synchronization with toggling of the read enable signal /RE provided from the storage controller 110. Ideally, the second training pattern Dout_2 is data having the same logical value as the first training pattern Dout_1. However, if a point in time to latch varies depending on the read timing offset, a data value received in the storage controller 110 may vary.

In operation S17, the storage controller 110 again adjusts the read timing offset set in operation S15. In this case, the storage controller 110 may release selection of the nonvolatile memory device NVM.

In operation S18, the storage controller 110 toggles the read enable signal /RE. In this case, the nonvolatile memory device NVM outputs a third training pattern Dout_3 in synchronization with toggling of the read enable signal /RE.

In operation S19, the storage controller 110 again adjusts the read timing offset set in operation S17. In this case, the storage controller 110 may release selection of the nonvolatile memory device NVM.

In a state where the read timing offset is adjusted depending on the above-described procedure, the storage controller 110 may toggle the read enable signal /RE to receive the training pattern from the nonvolatile memory device NVM. That is, the storage controller 110 may receive the training pattern from the nonvolatile memory device NVM by using all adjustable read timing offsets. If the last read timing offset is set in operation S20, in operation S21, the last training pattern Dout_N may be received.

In operation S22, the storage controller 110 may compare the received training patterns with a reference pattern. The storage controller 110 may select an optimal read timing offset depending on the comparison result.

The storage controller 110 may complete the read training of the selected nonvolatile memory device NVM through the above-described operations. Here, each of the read training command CMD_RT and the pattern address PT_ADD is used once to perform the read training on the nonvolatile memory device NVM corresponding to one chip. Accordingly, as the read training method of the disclosure is used, a length of a command sequence for the read training may be minimized, and a length of AC timing necessary for the read training operation may be minimized.

Figure 7:
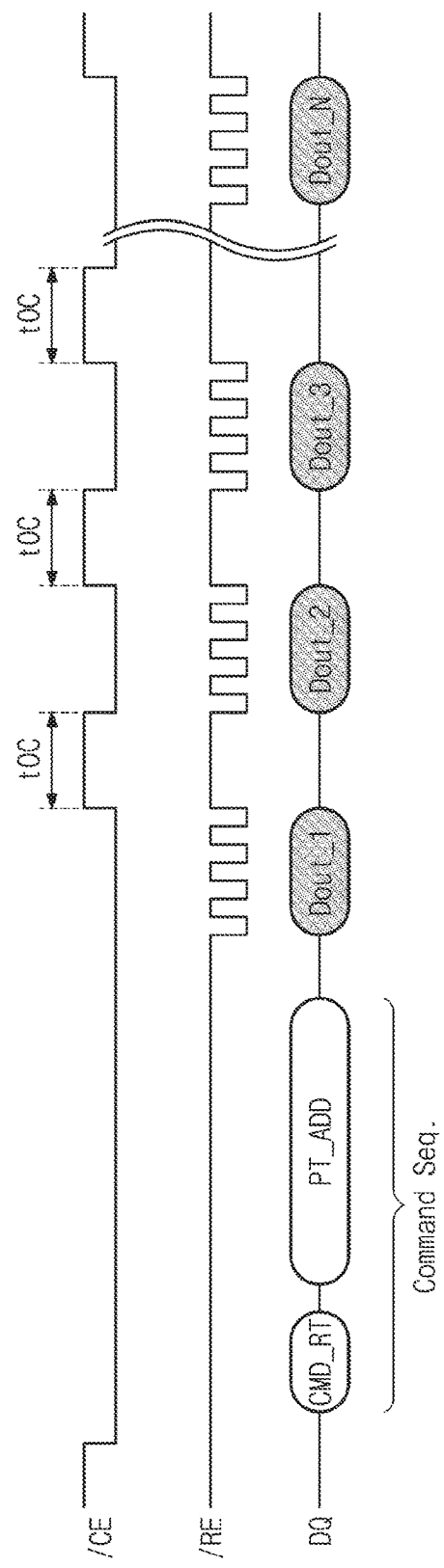
FIG. 7 is a timing diagram illustrating a command sequence and a data signal in a read training operation according to an embodiment of the disclosure.

FIG. 7 is a timing diagram illustrating a command sequence and the data signal DQ in a read training operation according to an embodiment of the disclosure. Referring to FIG. 7, in the read training operation, the storage controller 110 may provide a command sequence "CMD_RT-PT_ADD" once to the selected nonvolatile memory device NVM and may receive the training patterns Dout_1 to Dout_N under different timing offset conditions.

First, if the nonvolatile memory device NVM for the read training is selected, the storage controller 110 may activate the chip enable signal /CE of the selected nonvolatile memory device to a low level. Next, the storage controller 110 transmits the read training command CMD_RT and the pattern address PT_ADD to a data (DQ) line of the selected nonvolatile memory device NVM. Here, the read training command CMD_RT and the pattern address PT_ADD may be collectively referred to as a "training command sequence". Although not illustrated in FIG. 7, it may be well understood that a confirm code may follow the pattern address PT_ADD.

If the training command sequence is transmitted to the selected nonvolatile memory device NVM, the nonvolatile memory device NVM may internally recognize the read training command CMD_RT and may sense a requested training pattern. Next, if the storage controller 110 toggles the read enable signal /RE, the nonvolatile memory device NVM may output the sensed first training pattern Dout_1 to the data (DQ) line. If the first training pattern Dout_1 is completely output, the storage controller 110 may make the chip enable signal /CE transition to a high level to temporarily release the selection of the nonvolatile memory device NVM.

The storage controller 110 may adjust the read timing offset for latching data output from the nonvolatile memory device NVM while the chip enable signal /CE is deactivated. That is, during a time tOC when the chip enable signal /CE is deactivated, the storage controller 110 may adjust the read timing offset. However, it may be well understood that the storage controller 110 adjusts the read timing offset without a transition of the chip enable signal /CE.

If the read timing offset is completely adjusted, the storage controller 110 may activate the chip enable signal /CE to a low level and may toggle the read enable signal /RE. In this case, the nonvolatile memory device NVM may output the second training pattern Dout_2 to the data (DQ) line. If the second training pattern Dout_2 is completely output, the storage controller 110 may make the chip enable signal /CE transition to a high level to temporarily release the selection of the nonvolatile memory device NVM.

With the above description, the storage controller 110 may be provided with a plurality of training patterns from the nonvolatile memory device NVM by a read timing offset adjusted through a plurality of read timing offset adjusting operations. However, the training pattern may be provided repeatedly even though the read training command CMD_RT and the pattern address PT_ADD are provided once. As a result, according to the storage device 100 of the disclosure, the number of times that the read training command CMD_RT and the pattern address PT_ADD for the read training operation are input may be minimized. In addition, the AC timing may also decrease depending on the reduced command sequence.

Figure 8:
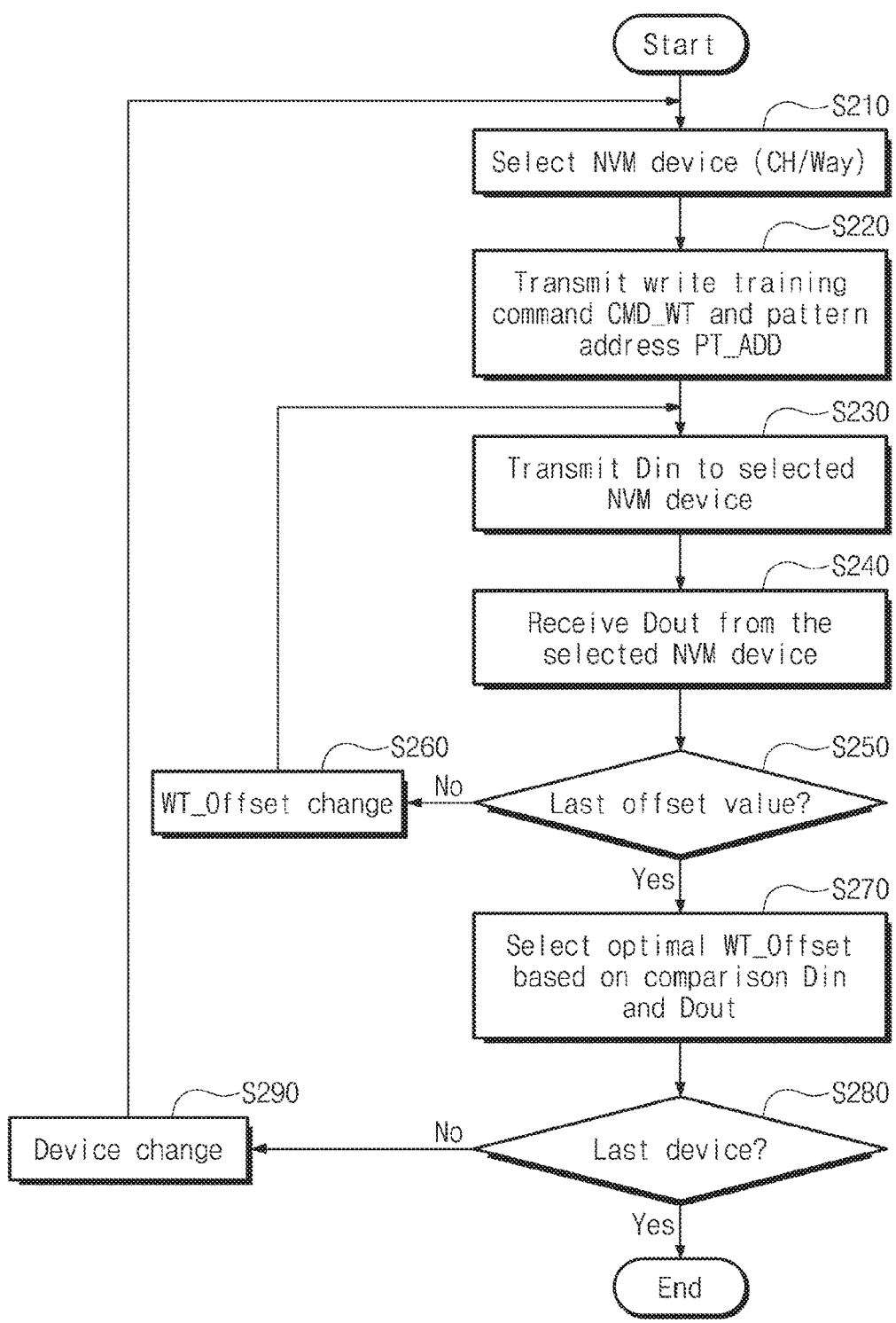
FIG. 8 is a flowchart illustrating a write training method according to an embodiment of the disclosure.

FIG. 8 is a flowchart illustrating a write training method according to an embodiment of the disclosure. Referring to FIG. 8, the storage device 100 of the disclosure may perform write training in a state where a write training command CMD_WT and the pattern address PT_ADD are provided once to a selected nonvolatile memory device.

In operation S210, the storage controller 110 selects any one of a plurality of nonvolatile memory devices included in the storage medium 120. To perform a write training operation, the storage controller 110 may select a channel CH and a way "Way". One nonvolatile memory device NVM corresponding to the selected channel and way is selected.

In operation S220, the storage controller 110 transmits the write training command CMD_WT and the pattern address PT_ADD to the selected nonvolatile memory device NVM. In this case, a chip enable signal /CE of the selected nonvolatile memory device NVM among the nonvolatile memory devices may be activated. A write timing offset WT_Offset for transmitting data from the storage controller 110 to the nonvolatile memory device NVM may be initialized.

In operation S230, the storage controller 110 transmits write data Din corresponding to a training pattern to the selected nonvolatile memory device NVM under the write timing offset WT_Offset set in operation S220. In this case, the nonvolatile memory device NVM may store the input data in a buffer (or a page buffer) provided for training.

In operation S240, the nonvolatile memory device NVM outputs the write data Din received in operation S230 to the storage controller 110 in response to a control signal (e.g., a read enable signal) from the storage controller 110. In this case, the storage controller 110 receives output data Dout that the nonvolatile memory device NVM outputs.

In operation S250, the storage controller 110 may determine whether the write timing offset WT_Offset applied in operation S230 is the last offset value among a plurality of write timing offsets adjustable. If the write timing offset WT_Offset applied in operation S230 is the last write timing offset, the process proceeds to operation S270. In contrast, if the write timing offset WT_Offset applied in operation S230 is not the last write timing offset, the process proceeds to operation S260.

In operation S260, the storage controller 110 changes the write timing offset WT_Offset. For example, the storage controller 110 may adjust the write timing offset WT_Offset of the clock circuit (e.g., a DLL circuit), which is generated to transmit data of the flash interface 119. Afterwards, the process may proceed to operation S230 for transmitting the training pattern to the nonvolatile memory device NVM by using the adjusted write timing offset WT_Offset.

In operation S270, the storage controller 110 may compare the training patterns, which are again read after being transmitted by using different write timing offsets, with a reference pattern. The storage controller 110 may select the write timing offset WT_Offset corresponding to a training pattern, which has the same logical value as the reference pattern, from among the received training patterns. The training manager 113 may select the selected write timing offset WT_Offset as an optimal write timing offset WT_Offset of the nonvolatile memory device selected in operation S210.

In operation S280, the storage controller 110 determines whether the nonvolatile memory device selected in operation S210 is the last device of the storage medium 120 for the write training operation. If the selected nonvolatile memory device is the last device of a write training target, the write training method may end. In contrast, if the selected nonvolatile memory device is not the last device of a write training target, the process proceeds to operation S290.

In operation S290, the storage controller 110 may select another nonvolatile memory device for the write training operation. Afterwards, the process proceeds to operation S210.

According to the write training method of the storage device 100 of the disclosure, it may be possible to receive a plurality of training patterns corresponding to various write timing offsets WT_Offset by providing the write training command CMD_WT and the pattern address PT_ADD once to a selected nonvolatile memory device. An optimal write timing offset WT_Offset may be determined by comparing a plurality of training patterns respectively corresponding to the various write timing offsets WT_Offset with the reference pattern.

Figure 9:
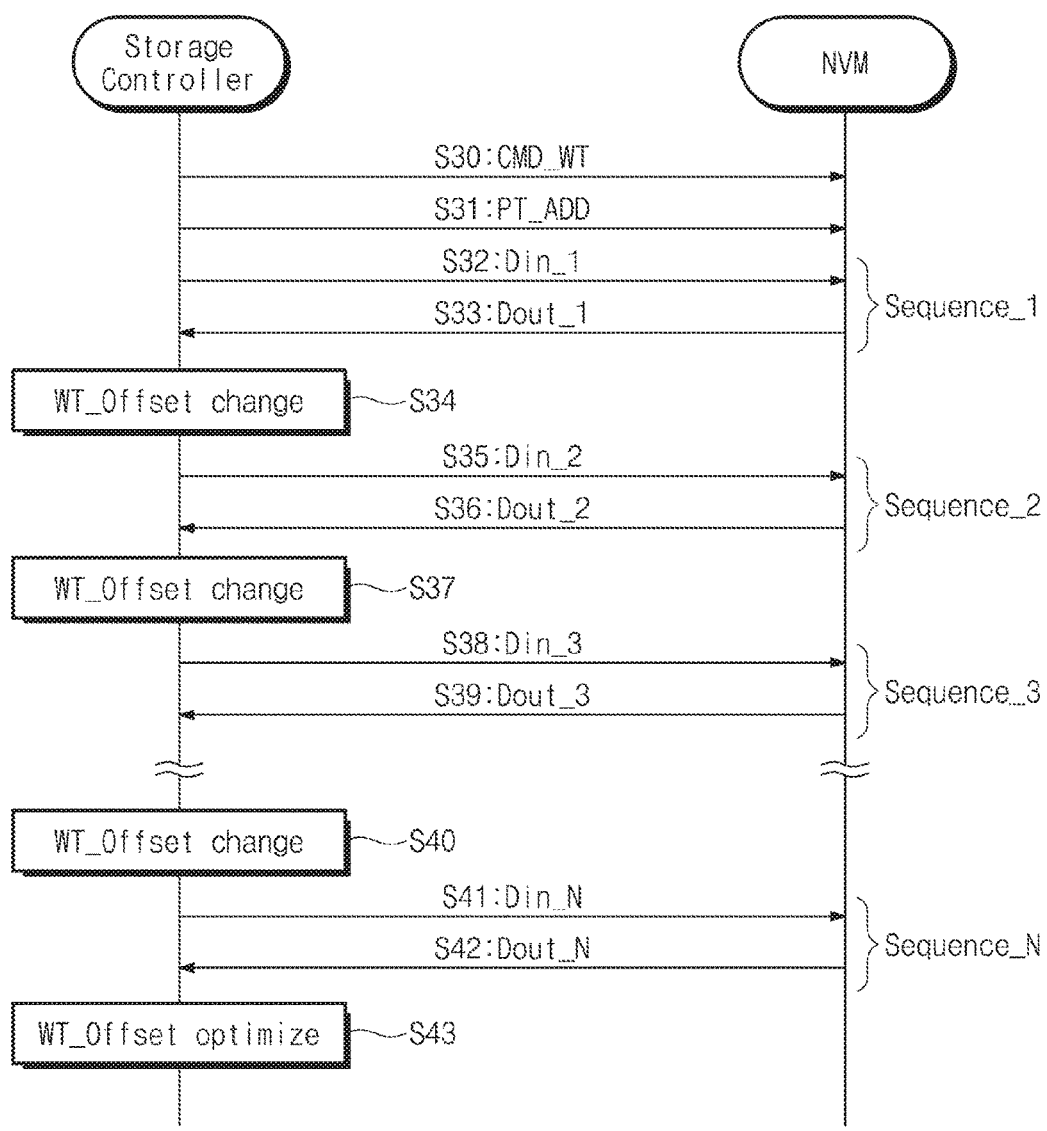
FIG. 9 is a view illustrating data exchanged between the storage controller and a nonvolatile memory device in a write training operation of FIG. 8.

FIG. 9 is a view illustrating data exchanged between a storage controller and a nonvolatile memory device in a write training operation of FIG. 8. Referring to FIG. 9, the storage controller 110 may perform write training in a state where the write training command CMD_WT and the pattern address PT_ADD are provided once to the nonvolatile memory device NVM.

In operation S30 and operation S31, the storage controller 110 transmits the write training command CMD_WT and the pattern address PT_ADD to the nonvolatile memory device NVM. Here, the write training command CMD_WT may be implemented with a specific command code provided through a data input/output pad of the nonvolatile memory device NVM. In a period where the specific command code is provided, a write enable signal /WE may be toggled together with activation of a command latch enable signal CLE. In this case, the write training command CMD_WT is input to the nonvolatile memory device NVM. The pattern address PT_ADD may be provided to the nonvolatile memory device NVM following the write training command CMD_WT.

In operation S32, the storage controller 110 transmits a training pattern to the nonvolatile memory device NVM by using the initialized write timing offset WT_Offset as input data Din. In this case, the storage controller 110 may toggle a data strobe signal DQS for the purpose of transmitting the input data Din to the nonvolatile memory device NVM. The nonvolatile memory device NVM may store the training pattern provided through a data signal (DQ) line in a buffer (e.g., a page buffer) provided therein.

In operation S33, the storage controller 110 is again provided with the training pattern transmitted to the nonvolatile memory device NVM. For example, the storage controller 110 may toggle the read enable signal /RE of the nonvolatile memory device NVM to receive the input training pattern as output data Dout again.

In operation S34, the storage controller 110 adjusts the write timing offset WT_Offset. In this case, the storage controller 110 may release selection of the nonvolatile memory device NVM. That is, the storage controller 110 may deactivate the chip enable signal /CE provided to the selected nonvolatile memory device to a high level.

In operation S35, the storage controller 110 may transmit a training pattern to the nonvolatile memory device NVM by using the write timing offset WT_Offset adjusted in operation S34 as input data Din. In this case, the storage controller 110 may toggle the data strobe signal DQS for the purpose of transmitting the input data Din to the nonvolatile memory device NVM through the data signal (DQ) line. The nonvolatile memory device NVM may store the training pattern provided through the data signal (DQ) line in a buffer (e.g., a page buffer) provided therein.

In operation S36, the storage controller 110 is again provided with the training pattern transmitted to the nonvolatile memory device NVM. For example, the storage controller 110 may toggle the read enable signal /RE of the nonvolatile memory device NVM to receive the input training pattern as output data Dout again.

In operation S37, the storage controller 110 adjusts the write timing offset WT_Offset. In this case, the storage controller 110 may release selection of the nonvolatile memory device NVM. That is, the storage controller 110 may deactivate the chip enable signal /CE provided to the selected nonvolatile memory device to a high level.

In operation S38, the storage controller 110 may transmit a training pattern to the nonvolatile memory device NVM by using the write timing offset WT_Offset adjusted in operation S37 as input data Din. In this case, the storage controller 110 may toggle the data strobe signal DQS for the purpose of transmitting the input data Din to the nonvolatile memory device NVM through the data signal (DQ) line. The nonvolatile memory device NVM may store the training pattern provided through the data signal (DQ) line in a buffer (e.g., a page buffer) provided therein.

In operation S39, the storage controller 110 is again provided with the training pattern transmitted to the nonvolatile memory device NVM. For example, the storage controller 110 may toggle the read enable signal /RE of the nonvolatile memory device NVM to receive the input training pattern as output data Dout again.

The write timing offset WT_Offset may be adjusted through operation S40, operation S41, and operation S42 in the same manner as described above, and the training pattern may be written and read in and from the nonvolatile memory device NVM by using the adjusted write timing offset WT_Offset.

In operation S43, training patterns written and read by using the write timing offsets WT_Offset are compared with the reference pattern by the storage controller 110. The storage controller 110 may determine an optimal write timing offset WT_Offset by using the comparison result.

The storage controller 110 may perform the write training of the selected nonvolatile memory device NVM through the above-described operations. Here, each of the write training command CMD_WT and the pattern address PT_ADD is used once to perform the write training on the nonvolatile memory device NVM corresponding to one chip. Accordingly, a length of a command sequence for the write training may be minimized, and a length of AC timing necessary for the write training operation may be minimized.

Figure 10:
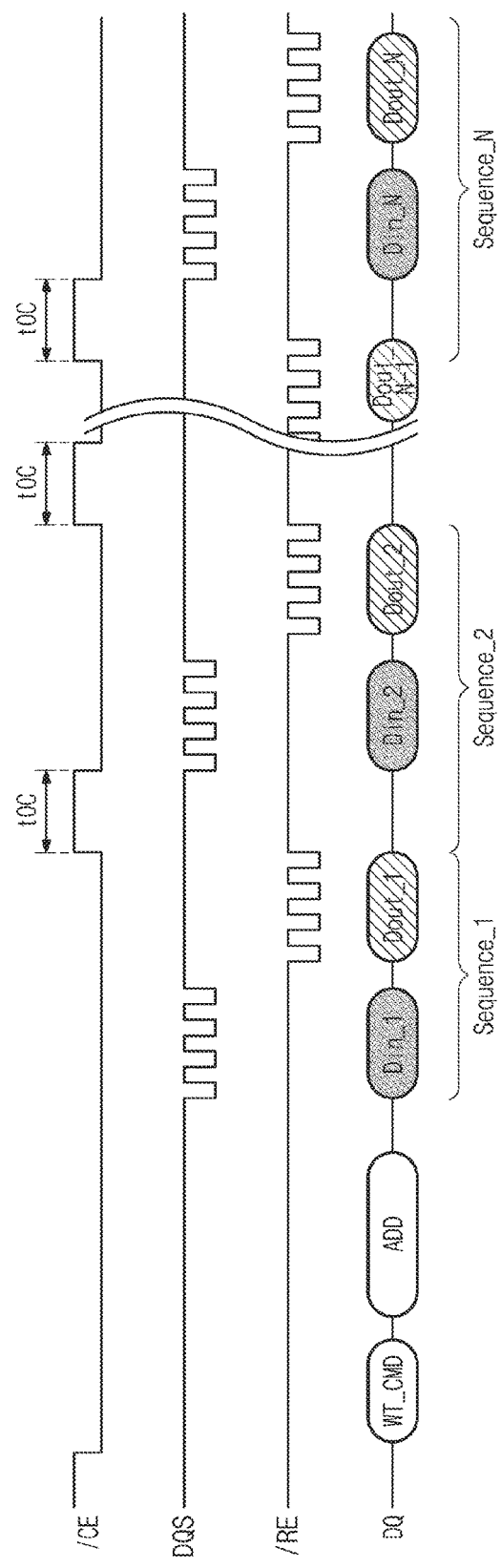
FIG. 10 is a timing diagram illustrating a command sequence and a data signal in a write training operation according to an embodiment of the disclosure.

FIG. 10 is a timing diagram illustrating a command sequence and the data signal DQ in a write training operation according to an embodiment of the disclosure. Referring to FIG. 10, the storage controller 110 provides a command sequence "CMD_WT-PT_ADD" once to a selected nonvolatile memory device NVM. The storage controller 110 may input and output a training pattern while adjusting the write timing offset WT_Offset.

If the nonvolatile memory device NVM for the write training operation is selected, the storage controller 110 may activate the chip enable signal /CE of the selected nonvolatile memory device to a low level. Next, the storage controller 110 transmits the write training command CMD_WT and the pattern address PT_ADD to a data (DQ) line of the selected nonvolatile memory device NVM. Here, the write training command CMD_WT and the pattern address PT_ADD may be collectively referred to as a "write training command sequence". Although not illustrated in FIG. 10, it may be well understood that a confirm code may follow the pattern address PT_ADD.

If the write training command sequence is transmitted to the selected nonvolatile memory device NVM, the nonvolatile memory device NVM may internally recognize the write training command CMD_WT. In this case, the nonvolatile memory device NVM may receive a following training pattern without an input of an additional command sequence and may again output the received training pattern.

Following one write training command sequence, the storage controller 110 transmits a training pattern as first write data Din_1 by using an initialized write timing offset. In this case, the storage controller 110 may control the nonvolatile memory device NVM in a way to toggle the data strobe signal DQS. If the input of the training pattern is completed, the nonvolatile memory device NVM outputs the input training pattern to the storage controller 110 as first output data Dout_1 again. In this case, the storage controller 110 may control the nonvolatile memory device NVM in a way to toggle the read enable signal /RE.

If the first training pattern is completely input and output, the storage controller 110 may make the chip enable signal /CE transition to a high level to temporarily release the selection of the nonvolatile memory device NVM. The storage controller 110 may adjust the write timing offset WT_Offset for transmitting data to the nonvolatile memory device NVM while the chip enable signal /CE is deactivated. That is, during a time tOC when the chip enable signal /CE is deactivated, the storage controller 110 may adjust the write timing offset.

If the write timing offset WT_Offset is completely adjusted, the storage controller 110 transmits the training pattern to the nonvolatile memory device NVM as second write data Din_2 by using the adjusted write timing offset WT_Offset. In addition, the storage controller 110 controls the nonvolatile memory device NVM such that the training pattern input to the nonvolatile memory device NVM is again output as second output data Dout_2. In this case, the storage controller 110 may control the nonvolatile memory device NVM by using the data strobe signal DQS and the read enable signal /RE.

With the above description, the storage controller 110 may write and read a training pattern in and from the nonvolatile memory device NVM by using a write timing offset adjusted through a plurality of write timing offset adjusting operations. However, the write training command CMD_WT and the pattern address PT_ADD for writing and reading a training pattern in and from the nonvolatile memory device NVM repeatedly are provided once. As a result, according to the storage device 100 of the disclosure, the number of times that the write training command CMD_WT and the pattern address PT_ADD for the write training operation are input may be minimized.

Figure 11:
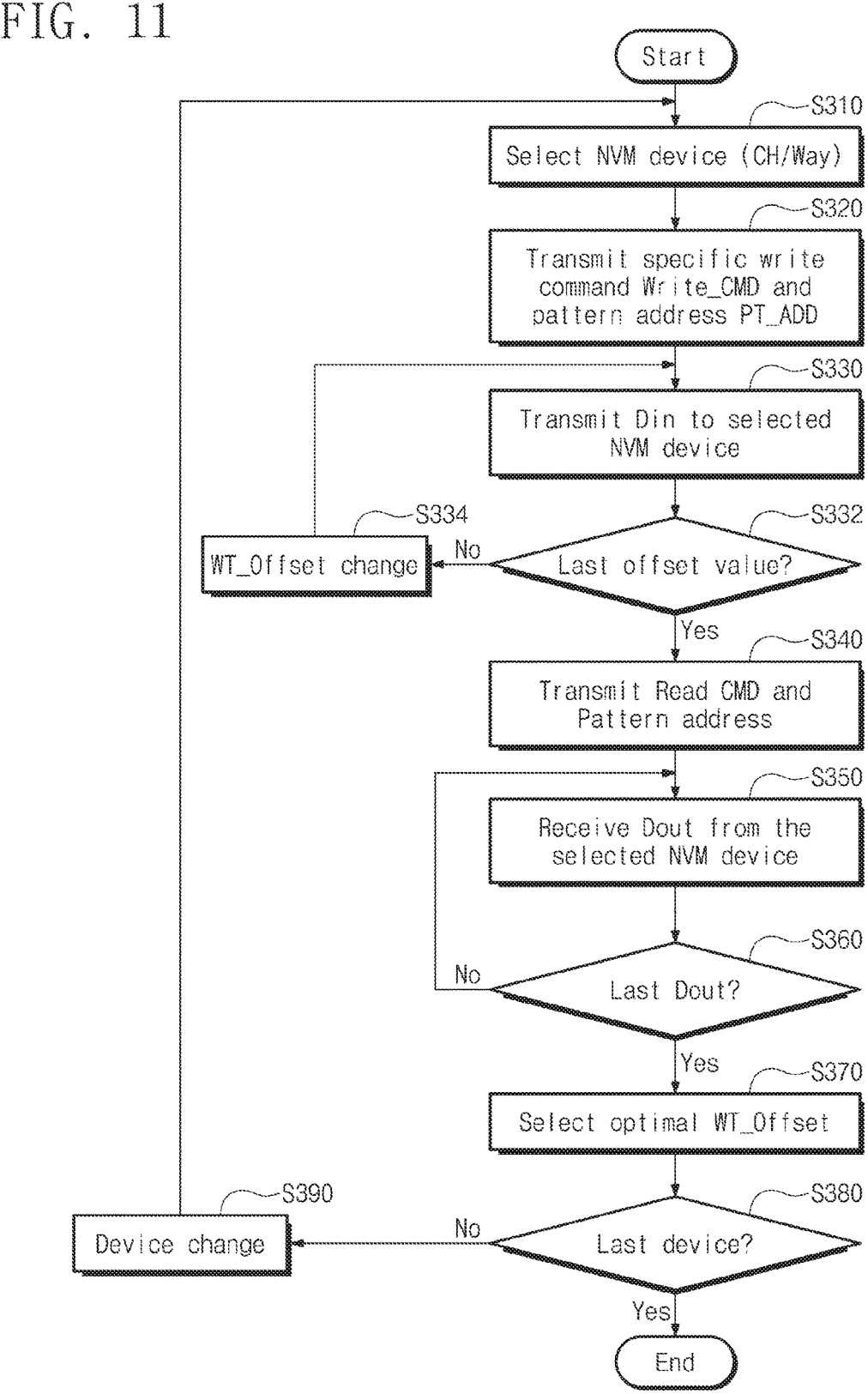
FIG. 11 is a flowchart illustrating a write training method according to another embodiment of the disclosure.

FIG. 11 is a flowchart illustrating a write training method according to another embodiment of the disclosure. Referring to FIG. 11, the storage device 100 of the disclosure provides a command sequence for inputting a training pattern to the nonvolatile memory device NVM selected in the write training operation and a command sequence for outputting the input training pattern to the nonvolatile memory device NVM selected in the write training operation. Accordingly, the storage controller 110 may perform the write training of the selected nonvolatile memory device NVM by using the command sequence twice.

In operation S310, the storage controller 110 selects any one of a plurality of nonvolatile memory devices included in the storage medium 120.

In operation S320, the storage controller 110 transmits a write command Write_CMD and the pattern address PT_ADD for writing the training pattern to the selected nonvolatile memory device NVM. In this case, a timing offset Timing_Offset for transmitting, at the storage controller 110, data from the storage controller 110 to the nonvolatile memory device NVM may have an initialized value.

In operation S330, the storage controller 110 transmits write data Din corresponding to the training pattern to the selected nonvolatile memory device NVM by using the write timing offset WT_Offset set in operation S320. In this case, the nonvolatile memory device NVM may store the input data in a buffer (or a page buffer) provided for training.

In operation S332, the storage controller 110 may determine whether the write timing offset WT_Offset applied in operation S330 is the last offset value among a plurality of write timing offsets adjustable. If the write timing offset WT_Offset applied in operation S330 is the last write timing offset, the process proceeds to operation S340. In contrast, if the write timing offset WT_Offset applied in operation S330 is not the last write timing offset, the process proceeds to operation S334.

In operation S334, the storage controller 110 changes the write timing offset WT_Offset. For example, the storage controller 110 may adjust an offset of the DLL circuit 118 (refer to FIG. 2) or the clock circuit for transmitting data of the flash interface 119. Afterwards, the process may proceed to operation S330 for transmitting the training pattern to the nonvolatile memory device NVM by using the adjusted write timing offset WT_Offset.

Operation S330, operation S332, and operation S334 correspond to a write operation loop in which the training pattern is written in the nonvolatile memory device NVM by using each write timing offset WT_Offset. Through the write operation loop "S330-S332-S334", the storage controller 110 may continuously write the training pattern in the nonvolatile memory device NVM under conditions corresponding to all configurable timing offset values.

If the write operation loop "S330-S332-S334" is completed, in operation S340, the storage controller 110 may perform a read operation loop for again reading the training pattern stored in the nonvolatile memory device NVM. For the read operation loop, the storage controller 110 transmits a read command Read_CMD and the pattern address PT_ADD to the nonvolatile memory device NVM.

In operation S350, the nonvolatile memory device NVM outputs the previously input training pattern to the storage controller 110 as output data Dout. In this case, the storage controller 110 may receive the output data Dout and may compare the received output data Dout with a reference pattern.

In operation S360, the storage controller 110 determines whether the output data Dout received in operation S350 are the last data input in the write operation loop "S330-S332-S334". If the output data Dout received in operation S350 correspond to the last data, the process proceeds to operation S370. In contrast, if the output data Dout received in operation S350 are not the last data, the process proceeds to operation S350 to continuously output the reference pattern.

In operation S370, the storage controller 110 may compare the training patterns, which are again read after being transmitted by using different write timing offsets, with the reference pattern. The storage controller 110 may select the write timing offset WT_Offset corresponding to a training pattern, which has the same logical value as the reference pattern, from among the received training patterns. The training manager 113 may select the selected write timing offset WT_Offset as an optimal write timing offset WT_Offset of the nonvolatile memory device selected in operation S310.

In operation S380, the storage controller 110 determines whether the nonvolatile memory device selected in operation S310 is the last device of the storage medium 120 for the write training operation. If the selected nonvolatile memory device is the last device of a write training target, the write training method may end. In contrast, if the selected nonvolatile memory device is not the last device of a write training target, the process proceeds to operation S390.

In operation S390, the storage controller 110 may select another nonvolatile memory device for the write training operation. Afterwards, the process proceeds to operation S310.

According to the write training method of the storage device 100 of the disclosure, a command sequence for inputting a training pattern to a selected nonvolatile memory device and a command sequence for outputting the input training pattern are used. Accordingly, two command sequences may be used to perform one write training operation on the selected nonvolatile memory device NVM.

Figure 12:
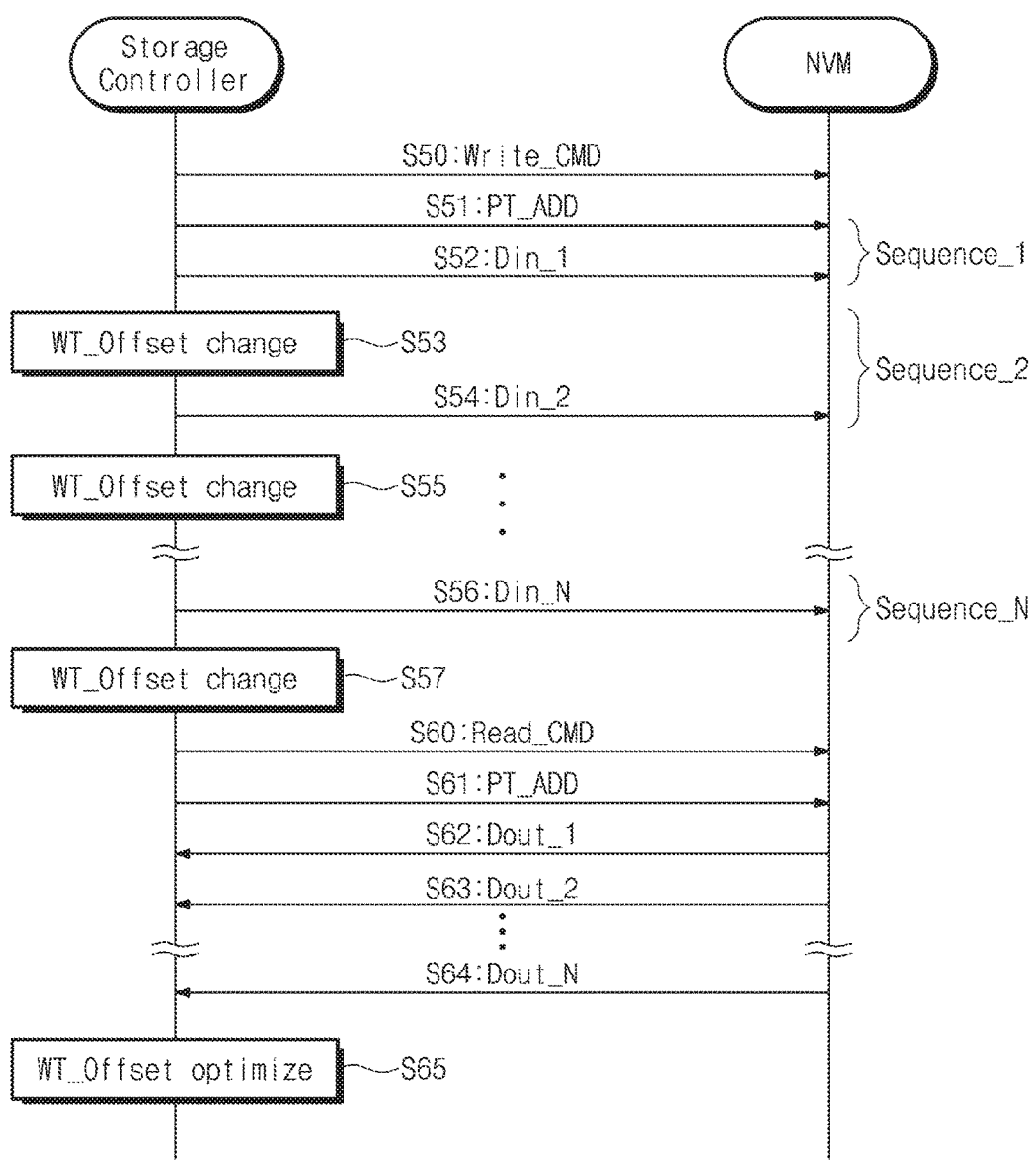
FIG. 12 is a view illustrating data exchanged between the storage controller and the nonvolatile memory device in a write training operation.

FIG. 12 is a view illustrating data exchanged between a storage controller and a nonvolatile memory device in a write training operation. Referring to FIG. 12, the storage controller 110 may perform write training on a selected nonvolatile memory device NVM by using two command sequences maximally.

In operation S50 and operation S51, the storage controller 110 transmits the write command Write_CMD and the pattern address PT_ADD for the write training to the nonvolatile memory device NVM. Here, the write command Write_CMD may be implemented with a specific command code that is provided to the nonvolatile memory device NVM. In a period where the specific command code is provided, a write enable signal /WE may be toggled together with activation of a command latch enable signal CLE. In this case, the write command Write_CMD is input to the nonvolatile memory device NVM. The pattern address PT_ADD may also be provided to the nonvolatile memory device NVM following the write training command Write_CMD.

In operation S52, the storage controller 110 transmits a training pattern to the nonvolatile memory device NVM by using the initialized write timing offset WT_Offset as input data Din. In this case, the storage controller 110 may toggle a data strobe signal DQS for the purpose of transmitting the input data Din to the nonvolatile memory device NVM. The nonvolatile memory device NVM may store the training pattern provided through the data signal (DQ) line in a buffer (e.g., a page buffer) provided therein.

In operation S53, the storage controller 110 adjusts the write timing offset WT_Offset. In this case, the storage controller 110 may release selection of the nonvolatile memory device NVM. That is, the storage controller 110 may deactivate the chip enable signal /CE provided to the selected nonvolatile memory device to a high level. However, a transition of the chip enable signal /CE may be selectively performed.

In operation S54, the storage controller 110 transmits a training pattern to the nonvolatile memory device NVM by using the adjusted write timing offset WT_Offset as input data Din.

In operation S55, the storage controller 110 again adjusts the write timing offset WT_Offset. In this case, the storage controller 110 may release selection of the nonvolatile memory device NVM for the purpose of adjusting the write timing offset WT_Offset.

In operation S56 and operation S57, the adjustment of the last write timing offset WT_Offset and an input of the last training pattern are performed in the same way as the above-described procedure.

In operation S60 and operation S61, the training pattern written in the nonvolatile memory device NVM by using various write timing offsets is read. To this end, the storage controller 110 transmits the read command Read_CMD and the pattern address PT_ADD to the nonvolatile memory device NVM. Here, the read command Read_CMD may be implemented with a specific command code that is provided to the nonvolatile memory device NVM. In a period where the specific command code is provided, a write enable signal /WE may be toggled together with activation of a command latch enable signal CLE. In this case, the read command Read_CMD is input to the nonvolatile memory device NVM. The pattern address PT_ADD may also be provided to the nonvolatile memory device NVM following the read command Read_CMD.

In operation S62 to operation S64, the training patterns written in the nonvolatile memory device NVM are provided to the storage controller 110 by using various write timing offsets. To receive the training patterns from the nonvolatile memory device NVM, the storage controller 110 may toggle the read enable signal /RE to receive the input training pattern as output data Dout.

In operation S65, the read training patterns are compared with the reference pattern by the storage controller 110. The storage controller 110 may determine an optimal write timing offset WT_Offset by using the comparison result.

The storage controller 110 may complete the write training of the selected nonvolatile memory device NVM through the above-described operations. Here, one write command sequence and one read command sequence are used to perform the write training on the nonvolatile memory device NVM corresponding to one chip. Accordingly, a length of a command sequence for the write training may be minimized, and a length of AC timing necessary for the write training operation may be minimized.

Figure 13:
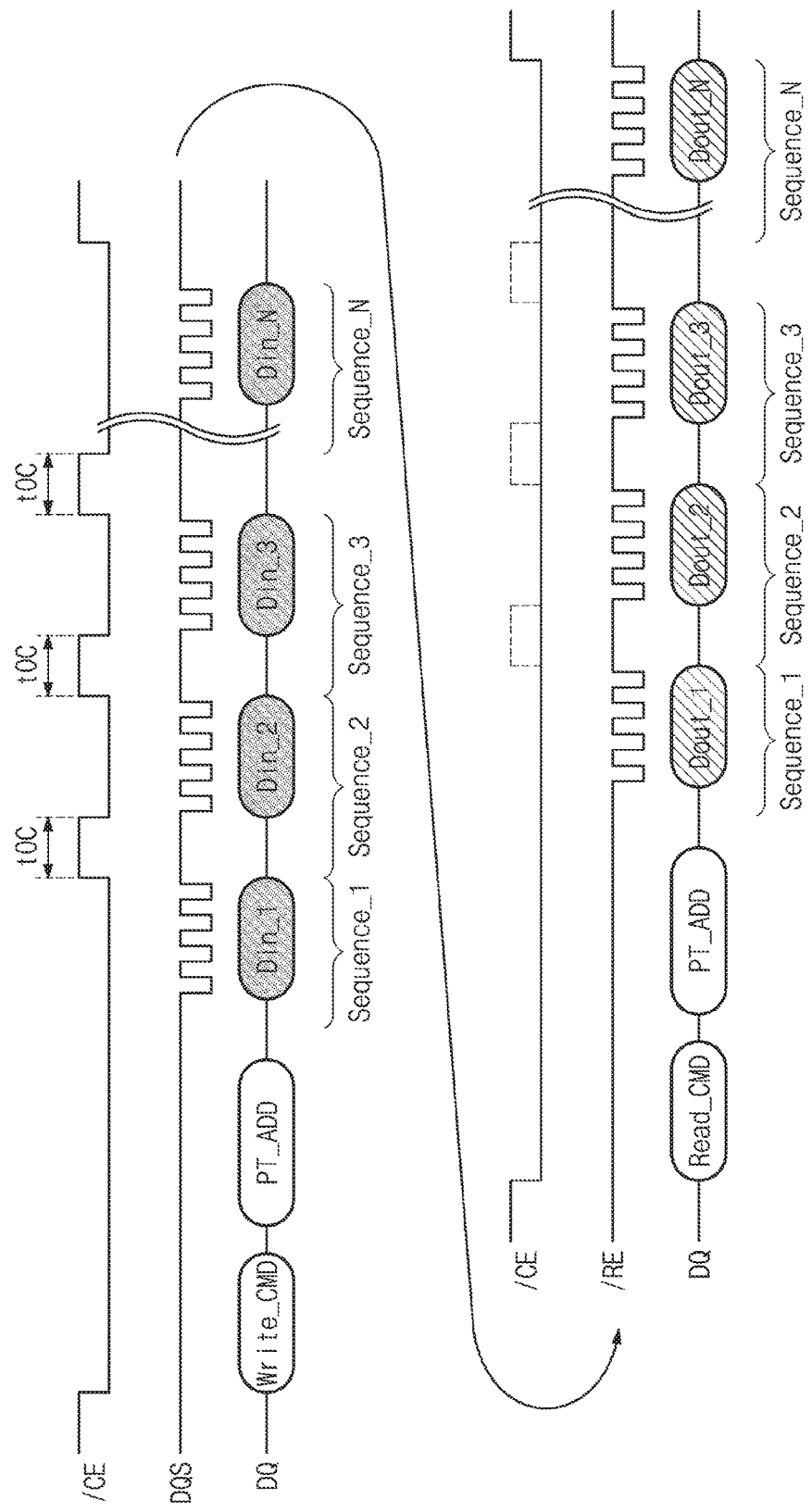
FIG. 13 is a timing diagram illustrating a command sequence and a data signal in a write training operation according to the embodiment illustrated in FIG. 11.

FIG. 13 is a timing diagram illustrating a command sequence and the data signal DQ in a write training operation according to the embodiment illustrated in FIG. 11. Referring to FIG. 13, the storage controller 110 may provide one write command sequence and one read command sequence to a selected nonvolatile memory device NVM to perform a write training operation.

If the nonvolatile memory device NVM for the write training operation is selected, the storage controller 110 may activate the chip enable signal /CE of the selected nonvolatile memory device to a low level. Next, the storage controller 110 transmits the write command Write_CMD and the pattern address PT_ADD to a data (DQ) line of the selected nonvolatile memory device NVM. Although not illustrated in FIG. 13, it may be well understood that a confirm code may follow the pattern address PT_ADD.

If the write command sequence is transmitted to the selected nonvolatile memory device NVM, the nonvolatile memory device NVM may internally recognize the write command Write_CMD. In this case, the nonvolatile memory device NVM may recognize that a write training pattern is continuously input.

Following the write command sequence, the storage controller 110 transmits a training pattern as first write data Din_1 by using an initialized write timing offset. In this case, the storage controller 110 may toggle the data strobe signal DQS to control the nonvolatile memory device NVM.

If the first data Din_1 is completely input, the storage controller 110 may make the chip enable signal /CE transition to a high level to temporarily release the selection of the nonvolatile memory device NVM. The storage controller 110 may adjust the write timing offset WT_Offset for transmitting data to the nonvolatile memory device NVM in a period tOC when the chip enable signal /CE is deactivated.

If the write timing offset WT_Offset is completely adjusted, the storage controller 110 transmits the training pattern to the nonvolatile memory device NVM as second write data Din_2 by using the adjusted write timing offset WT_Offset.

If training patterns corresponding to all write timing offsets are completely written in the above-described manner, a read command sequence (a command and an address) for reading the input training patterns are input. The storage controller 110 transmits the read command Read_CMD and the pattern address PT_ADD to the selected nonvolatile memory device NVM. Although not illustrated in FIG. 13, it may be well understood that a confirm code may follow the pattern address PT_ADD.

If the read command sequence is transmitted to the selected nonvolatile memory device NVM, the nonvolatile memory device NVM may internally recognize the read command Read_CMD for the write training operation. In this case, the nonvolatile memory device NVM may continuously output the previously received training patterns under control of the storage controller 110.

The nonvolatile memory device NVM provides all input training patterns again to the storage controller 110 as output data Dout_1, Dout_2, . . . , Dout_N. In this case, the storage controller 110 may control the nonvolatile memory device 111 in a way to toggle the read enable signal /RE. In addition, the chip enable signal /CE may be deactivated between two adjacent ones of the output data Dout_1, Dout_2, . . . , Dout_N.

With the above description, the storage controller 110 may write and read data in and from the nonvolatile memory device NVM by using a write timing offset adjusted through a plurality of write timing offset adjusting operations. However, two command sequences are used to write and read a training pattern in and from the nonvolatile memory device NVM repeatedly. According to the storage device 100 of the disclosure, the number of times that a command sequence for the write training operation is input may be minimized, and thus, a length of AC timing may decrease.

According to an embodiment of the disclosure, it may be possible to markedly reduce a time taken for data training of a nonvolatile memory device. Accordingly, it may be possible to reduce a booting time (or an open time) of a storage device.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to embodiments, it will be apparent to those skilled in the art that various changes and modifications may be made without departing from the spirit and scope of the disclosure. Therefore, it should be understood that the above embodiments are not limiting, but illustrative.

What is claimed is:

1. A data training method of a storage device which comprises a storage controller and a nonvolatile memory device, the method comprising:
transmitting, by the storage controller, single read training command including an address to the nonvolatile memory device;
receiving, by the storage controller and under a first read timing offset condition, a first training pattern output from the nonvolatile memory device in response to the read training command;
receiving, by the storage controller and under a second read timing offset condition, a second training pattern output from the nonvolatile memory device in response to the read training command;
wherein a chip enable signal of the nonvolatile memory device is deactivated, by the storage controller, while the write timing offset is changed from the first write timing offset to the second write timing offset; and
comparing, by the storage controller, the first training pattern and the second training pattern with a reference pattern and determining a read timing offset of the storage controller based on a result of the comparison.

2. The method of claim 1, wherein the read training command is once transmitted, by the storage controller, to perform a read training operation of the nonvolatile memory device.

3. The method of claim 1, wherein the nonvolatile memory device outputs the second training pattern in response to the read training command without an additional command after the first training pattern is output.

4. The method of claim 3, wherein the nonvolatile memory device outputs the first training pattern and the second training pattern in response to a read enable signal transmitted by the storage controller.

5. The method of claim 1, further comprising:
changing, by the storage controller and after the storage controller receives the first training pattern under the first read timing offset condition, a first sampling time point for receiving data output from the nonvolatile memory device to a second sampling time point for receiving data output from the nonvolatile memory device, wherein
the first sampling time point corresponds to the first read timing offset condition and the second sampling time point corresponds to the second read timing offset condition.

6. The method of claim 5, wherein:
the chip enable signal of the nonvolatile memory device is deactivated, by the storage controller, while the first sampling time point is changed to the second sampling time point, and
the storage controller samples data output from the nonvolatile memory device during the first sampling time point, under the first read timing offset condition, and
the storage controller samples data output from the nonvolatile memory device during the second sampling time point, under the second read timing offset condition.

7. The method of claim 1, further comprising transmitting, by the storage controller, an address of the first and second training patterns after the read training command is transmitted to the nonvolatile memory device.

8. A data training method of a storage device, which comprises a storage controller and a nonvolatile memory device, the method comprising:
inputting, from the storage controller, single write training command including an address to the nonvolatile memory device;
inputting, from the storage controller, a training pattern to the nonvolatile memory device under a first write timing offset condition following the write training command;
reading, by the storage controller, the training pattern written under the first write timing offset condition from the nonvolatile memory device as first output data;
inputting, from the storage controller, the training pattern to the nonvolatile memory device under a second write timing offset condition;
reading, by the storage controller, the training pattern written under the second write timing offset condition from the nonvolatile memory device as second output data;

wherein a chip enable signal of the nonvolatile memory device is deactivated, by the storage controller, while the timing offset is changed from the first write timing offset to the second write timing offset; and comparing, by the storage controller, the first output data and the second output data with a reference pattern and determining a write timing offset of the storage controller based on a result of the comparison.

9. The method of claim 8, further comprising:

changing, by the storage controller, the write timing offset of the storage controller from the first write timing offset condition to the second write timing offset, wherein the chip enable signal of the nonvolatile memory device is deactivated, by the storage controller, while the write timing offset is changed.

10. The method of claim 9, wherein the storage controller is provided with the second output data without transmitting a command from the storage controller, after changing the write timing offset to the second write timing offset condition.

11. The method of claim 10, wherein after changing the write timing offset to the second write timing offset, the storage controller reads the second output data from the nonvolatile memory device by using a read enable signal, while the chip enable signal is activated.

12. The method of claim 8, wherein the first output data and the second output data are output in response to the write training command and a read enable signal transmitted by the storage controller.

13. The method of claim 8, further comprising transmitting, by the storage controller, an address of the training pattern after the write training command is transmitted, by the storage controller, to the nonvolatile memory device.

14. A data training method of a storage device, which comprises a storage controller and a nonvolatile memory device, the method comprising:

inputting, from the storage controller, a write command including an address to the nonvolatile memory device;

writing, by the storage controller and following the write command, a training pattern in the nonvolatile memory device repeatedly under different write timing offset conditions;

inputting, from the storage controller, a read command to the nonvolatile memory device;

receiving, by the storage controller and in response to the read command, a plurality of transmissions of the training pattern from the nonvolatile memory device;

wherein a chip enable signal of the nonvolatile memory device is deactivated, by the storage controller, while the timing offset is changed from one write timing offset to another write timing offset; and determining, by the storage controller, a write timing offset of the storage controller by using the plurality of transmissions of the training pattern.

15. The method of claim 14, wherein the writing of the training pattern in the nonvolatile memory device repeatedly under the different write timing offset conditions includes:

inputting, from the storage controller, the training pattern to the nonvolatile memory device by using a data strobe signal under a first write timing offset condition;

setting, by the storage controller, a timing circuit of the storage controller to a second write timing offset condition; and inputting, from the storage controller, the training pattern to the nonvolatile memory device by using the data strobe signal under the second write timing offset condition.

16. The method of claim 15, wherein the writing of the training pattern in the nonvolatile memory device repeatedly under the different write timing offset conditions is performed without using a command transmitted by the storage controller.

17. The method of claim 15, wherein a chip enable signal of the storage controller is deactivated, by the storage controller, in the setting of the timing circuit of the storage controller to the second write timing offset condition.

18. The method of claim 15, wherein the nonvolatile memory device stores the training pattern, input under different write timing offsets, in a page buffer.

19. The method of claim 14, wherein the storage controller reads the plurality of transmissions of the training pattern by using a read enable signal transmitted by the storage controller.

20. The method of claim 14, further comprising transmitting, by the storage controller, an address at which the training pattern is to be written in the nonvolatile memory device.

* * * * *